(12) United States Patent
Amendolea et al.

(10) Patent No.: US 7,638,963 B2
(45) Date of Patent: Dec. 29, 2009

(54) ROTARY INDEXING TABLE DRIVEN BY AN INDUCTION MOTOR

(75) Inventors: Richard M. Amendolea, Canfield, OH (US); Rick Steinkamp, Brunswick, OH (US)

(73) Assignee: Centricity Corporation, Girard, OH (US)

( * ) Notice: Subject to any disclaimer, the term of this patent is extended or adjusted under 35 U.S.C. 154(b) by 736 days.

(21) Appl. No.: 11/235,681

(22) Filed: Sep. 26, 2005

(65) Prior Publication Data

US 2007/0137433 A1    Jun. 21, 2007

(51) Int. Cl.
  G05B 11/01    (2006.01)
  G05B 11/32    (2006.01)
(52) U.S. Cl. .................. 318/560; 318/561; 318/562; 318/652
(58) Field of Classification Search .................. 318/560, 318/561, 632, 652, 811, 562; 324/207.25
See application file for complete search history.

(56) References Cited

U.S. PATENT DOCUMENTS

| 3,850,051 | A |   | 11/1974 | Woltjen et al. |
|---|---|---|---|---|
| 4,211,512 | A |   | 7/1980 | Zankl |
| 4,274,773 | A |   | 6/1981 | Burkhardt et al. |
| 4,611,797 | A |   | 9/1986 | Cetnarowski |
| 4,656,951 | A |   | 4/1987 | Kimura et al. |
| 4,899,998 | A |   | 2/1990 | Teramachi |
| 4,962,976 | A | * | 10/1990 | Takahashi et al. ........... 318/811 |
| 5,481,936 | A |   | 1/1996 | Yanagisawa |
| 5,635,808 | A |   | 6/1997 | Roseliep |
| 5,784,932 | A | * | 7/1998 | Gilberti ..................... 74/813 R |
| 6,352,496 | B1 |   | 3/2002 | Oldani |
| 6,519,860 | B1 |   | 2/2003 | Bieg et al. |
| 6,722,289 | B2 |   | 4/2004 | Kato |
| 6,843,152 | B2 |   | 1/2005 | Byford |
| 6,862,786 | B2 |   | 3/2005 | Kato |
| 7,196,489 | B2 | * | 3/2007 | Taniguchi et al. ........... 318/652 |
| 2002/0030488 | A1 | * | 3/2002 | Ito ......................... 324/207.25 |
| 2002/0170188 | A1 |   | 11/2002 | Kato |
| 2003/0106394 | A1 |   | 6/2003 | Byford |
| 2004/0162700 | A1 |   | 8/2004 | Rosenberg et al. |
| 2004/0174162 | A1 | * | 9/2004 | Kuwahara ............... 324/207.25 |
| 2004/0251867 | A1 |   | 12/2004 | Weiss |
| 2005/0166413 | A1 |   | 8/2005 | Crampton |
| 2007/0205761 | A1 | * | 9/2007 | Chang et al. ........... 324/207.25 |

* cited by examiner

Primary Examiner—Paul Ip
(74) Attorney, Agent, or Firm—The Webb Law Firm

(57) ABSTRACT

The present invention is a rotary indexing table driven by an induction motor. The rotary indexing table includes a rotatable work supporting platform, an AC induction motor including a motor shaft coupled to the rotatable work supporting platform; and a controller operatively coupled to the AC induction motor. The AC induction motor is equipped with a high resolution positional feedback device. The high-resolution positional feedback device may be an encoder or a resolver. The controller is configured to drive the AC induction motor in a direct drive manner. The high-resolution positional feedback device is operatively coupled to the controller, and the controller is configured to filter a signal provided by the high-resolution positional feedback device. The signal provided by the high-resolution positional feedback device may be a square wave or a sine wave. The present invention is also directed to a method precisely driving and positioning a rotary indexing table.

14 Claims, 6 Drawing Sheets

ROTARY INDEXING TABLE DRIVEN BY AN INDUCTION MOTOR

BACKGROUND OF THE INVENTION

1. Field of the Invention

This invention relates generally to rotary tables. More particularly, the present invention relates to a rotary indexing table utilizing an AC induction motor with a high-resolution positional feedback device.

2. Description of Related Art

Rotary tables, such as rotary indexing tables, are well-known for the accurate positioning of work pieces at work stations for automated operations. Rotary indexing tables typically have a table and an indexer assembly that rotates the table through a predetermined angle for positioning work pieces for sequential automated operations.

Rotary indexing tables have been successfully employed in the field of automated assembly for work stations including pick and place devices, feeder bowls, visual inspections, label applicators, robot arms, adhesive applicators, laser machining and other automated assembly processes. Rotary indexing tables are further well-known in the fields of machining for the accurate positioning of work pieces to receive drilling, boring, tapping, CNC machining, facing, grinding, and other types of machining processes. Other uses for rotary indexing tables include the accurate positioning of work pieces for coating, sterilizing, cleaning, testing and calibrating.

As described in U.S. Pat. No. 5,950,503, rotary indexing tables have also been used in the decorating field for screen printing, hot stamping, pad printing, ink jet printing, impact marking, laser marking, spray painting and other decorative processes. For example, rotary indexing tables are currently employed for multi-color screen printing onto work pieces such as CD's, credit cards, key fobs, etc. Typically, a rotary indexing table supports multiple, equidistantly positioned fixtures. The fixtures receive and support the work pieces during the printing operations. At a first work station, a work piece is automatically positioned onto the fixture. The table then rotates through a precise angle or distance to position the work piece under a first screen printing apparatus. After the printing is completed, the table rotates through the same angle again to position the work piece for receiving a second overlaying screen print image. The indexing process continues until the work piece has received all the required layers of screen printing and is removed from the fixture at a final work station.

With the need for very precise machining and close tolerances in manufacture, rotary indexing tables have had to be much more precise and provide more through-put in order for the industry to remain competitive. Rotary indexing tables, for example, may be required to move through a complex set of rotary profiles such as continuous rotation, indexing with a dwell time, oscillation, variable speed or reverse direction. It would be advantageous to have an assembly capable of all these motions while maintaining precision. In addition, with the advent of robotics these assemblies are required to place a work piece at various work angles relative to the work station to provide access from automated operational equipment.

Typically, prior art rotary indexing tables, also known as turntables, are centrally driven and work is performed at the periphery of the table. Alternately, when tables are driven on their outside diameter, the drive mechanism tends to be outside the periphery of the table and thus impedes use of the assembly in various angles and in operations where space is at a premium.

Most prior art rotary indexing tables are driven by cams or geneva mechanisms through a speed reducer and electric motor. Rotary indexing tables of this type suffer from various drawbacks including a fixed number of index positions, the inability to provide continuous rotation and the inability to be programmed.

Another prior art method of driving a rotary indexing table utilizes a ring gear and pinion arrangement powered with a speed reducer and electric motor. This method, however, also suffers from a variety of drawbacks. For instance, the use of a ring gear and pinion arrangement has a lower precision due to backlash. Also, such arrangements are very costly.

A third prior art method of driving a rotary indexing table is through the use of a servomotor configured to drive a cam or pinion gear. The use of a servomotor is costly and also requires a large number of mechanical components. Furthermore, servomotors usually require a load-to-motor inertia mismatch that is very low, such as 10 to 1. If the load-to-motor inertia mismatch exceeds this requirement, the result is instability and poor performance.

A final prior art method for driving a rotary indexing table is the use of a low speed direct drive permanent magnet motor. Such direct drive permanent magnet motors, however, are very expensive. Furthermore, the bearing loads of such motors limit the use of overhung loads on the tooling ring.

Accordingly, a need exists for a rotary indexing table with a drive mechanism that is of low cost while still providing high precision. A further need exists for a rotary indexing table with a simplified design including few moving parts so as to reduce backlash. A final need exits for a drive mechanism for a rotary indexing table that provides accurate positioning and smooth motion in the presence of very high inertial loads.

SUMMARY OF THE INVENTION

The present invention is a rotary indexing table driven by an induction motor. The rotary indexing table includes a rotatable work supporting platform, an AC induction motor including a motor shaft coupled to the rotatable work supporting platform; and a controller operatively coupled to the AC induction motor. The AC induction motor is equipped with a high resolution positional feedback device. The high-resolution positional feedback device may be an encoder or a resolver. The controller is configured to drive the AC induction motor in a direct drive manner. The high-resolution positional feedback device is operatively coupled to the controller, and the controller is configured to filter a signal provided by the high-resolution positional feedback device. The signal provided by the high-resolution positional feedback device may be a square wave or a sine wave.

The present invention is further directed to a rotary indexing table for supporting workpieces and moving the workpieces through a plurality of positions. The rotary indexing table comprises a rotatable, substantially planar, circular work supporting platform; a directly driven AC induction motor including a motor shaft coupled to the rotatable work supporting platform and a high resolution positional feedback device; and a controller operatively coupled to the AC induction motor and high-resolution positional feedback device. The controller is configured to filter a signal provided by the high-resolution positional feedback device.

The present invention is further directed to a method of precisely driving and positioning a rotary indexing table. The method includes the steps of providing a rotary indexing table including a rotatable work supporting platform; an AC induction motor including a motor shaft coupled to the rotatable work supporting platform and a high-resolution positional feedback device; and a controller operatively coupled to the AC induction motor. Next, the rotatable work supporting platform is driven using the AC induction motor and the high-resolution positional feedback device. Then a feedback signal is provided by the high-resolution positional feedback device, and the controller filters the feedback signal to produce a filtered signal. Finally, the AC induction motor is controlled to position the rotatable work supporting platform based on the filtered signal.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a", "an", and "the" include plural referents unless the context clearly dictates otherwise.

DETAILED DESCRIPTION OF THE INVENTION

Figure 1:
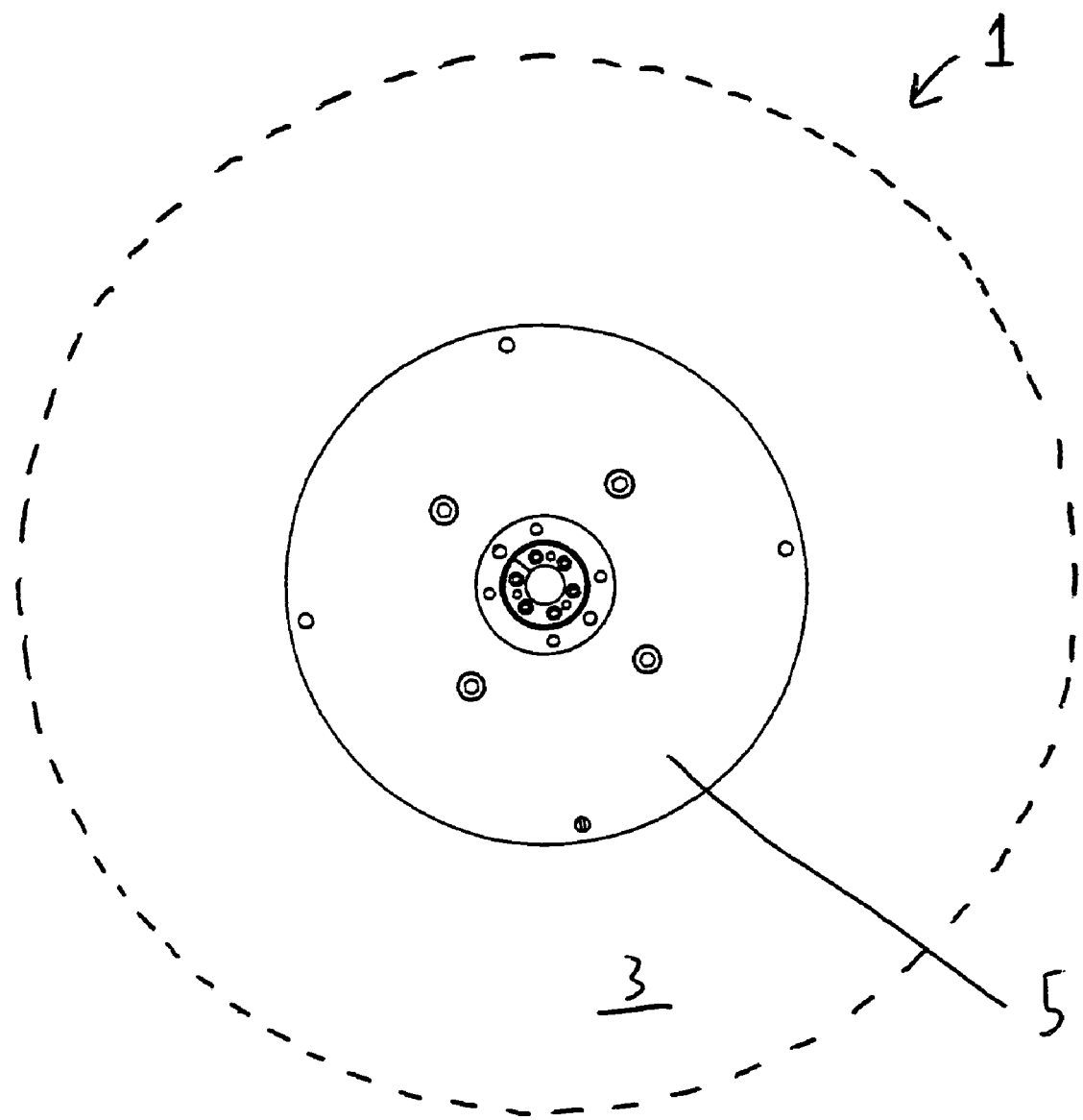
FIG. 1 is a top plan view of a rotary indexing table driven by an AC induction motor with a high-resolution positional feedback device in accordance with the present invention.

For purposes of the description hereinafter, the terms "upper", "lower", "right", "left", "vertical", "horizontal", "top", "bottom", "lateral", "longitudinal" and derivatives thereof shall relate to the invention as it is oriented in the drawing figures. However, it is to be understood that the invention may assume various alternative variations, except where expressly specified to the contrary. It is also to be understood that the specific devices illustrated in the attached drawings, and described in the following specification, are simply exemplary embodiments of the invention. Hence, specific dimensions and other physical characteristics related to the embodiments disclosed herein are not to be considered as limiting.

Figure 2:
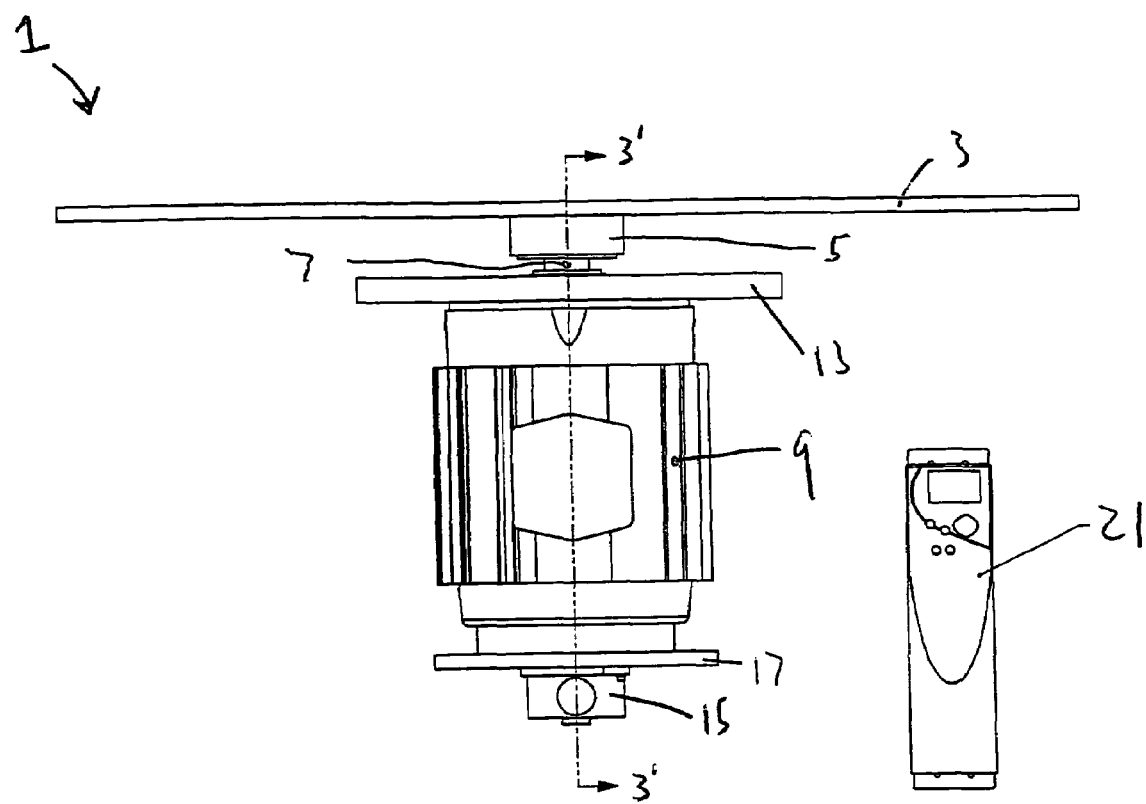
FIG. 2 is a side plan view of the rotary indexing table driven by an AC induction motor with a high-resolution positional feedback device in accordance with the present invention.
Figure 3:
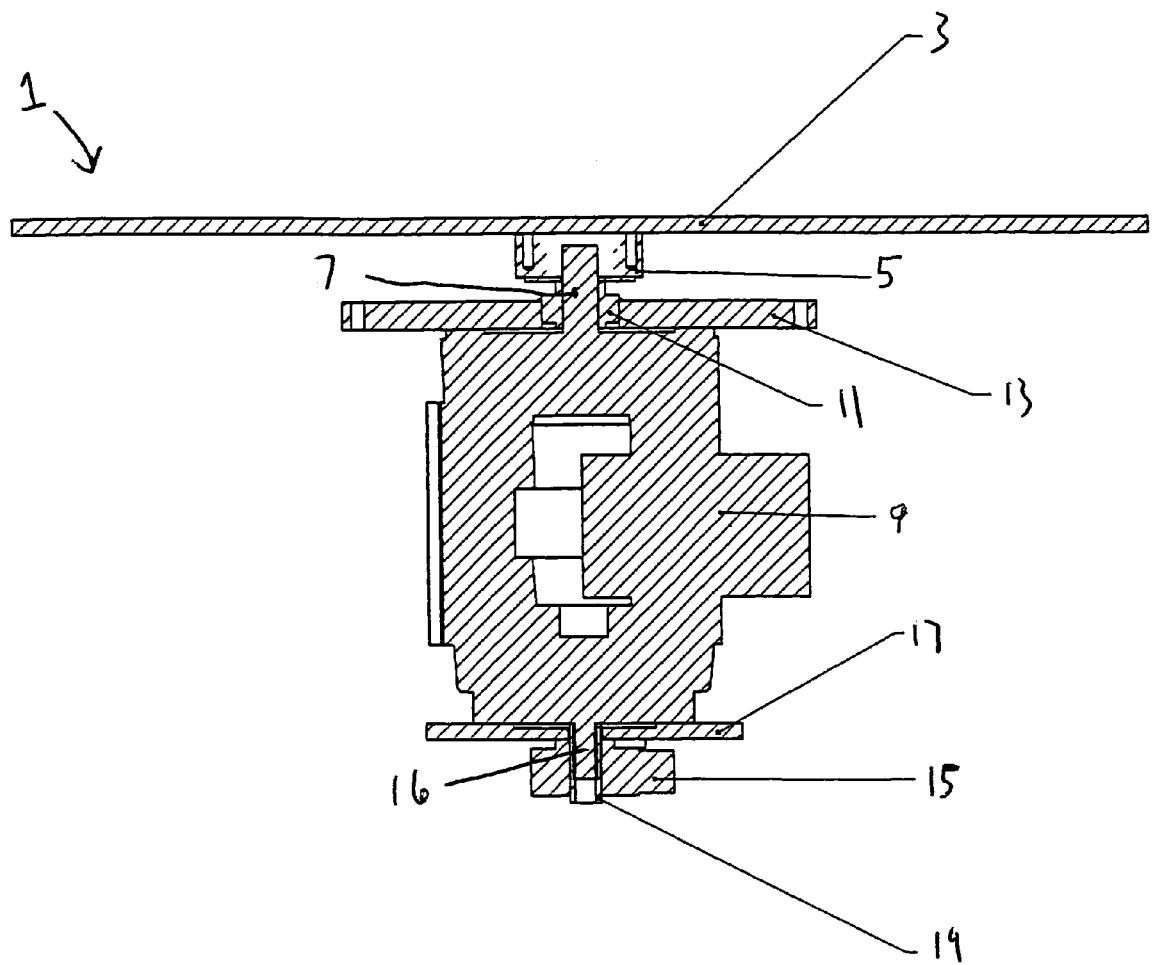
FIG. 3 is a cross-sectional view taken along line 3'-3' in FIG. 2.

With reference to FIGS. 1-3, a rotary indexing table 1 includes a rotatable work supporting platform 3. Rotatable work supporting platform 3 is used to support work pieces, tooling, fixtures and the like for positioning as is known in the art. Rotatable work supporting platform 3 is rotationally mounted to a drive hub 5, which is in turn coupled to a drive end 7 of a motor shaft of an AC induction motor 9. Rotary indexing table 1 is also configured to include a bearing 11 secured by a flange mount bearing plate 13. Bearing 11 allows for smooth rotation of work supporting platform 3.

The use of AC induction motor 9 is advantageous because construction costs are relatively low compared with other types of motors, and AC induction motors are very reliable. In general, an AC induction motor includes a stator and a rotor. In operation, a rotating magnetic field is generated in the stator, which induces a magnetic field in the rotor. The two fields interact and cause the rotor to turn. To obtain maximum interaction between the fields, a very small air gap is provided between the rotor and stator. The speed of the rotor depends upon the torque requirements of the load. The bigger the load, the stronger the turning force needed to rotate the rotor. The turning force can increase only if a rotor-induced electromagnetic field increases. This electromagnetic field can increase only if the magnetic field cuts through the rotor at a faster rate. To increase the relative speed between the field and rotor, the rotor must slow down. Therefore, for heavier loads the induction motor turns slower than for lighter loads. Furthermore, AC induction motor 9 may be directly driven. This is advantageous because the use of a directly driven induction motor eliminates the need for gearing or belting thereby simplifying the design and reducing backlash. Furthermore, the elimination of gearing and belting also allows the motor to provide stable performance even in the presence of large inertial loads.

Rotary indexing table 1 further includes a high-resolution feedback device 15 coupled to the opposite end 16 of the motor shaft using a mounting plate 17 and an adapter shaft 19. High-resolution positional feedback device 15 may be an encoder, a resolver or the like. The resolution of high-resolution positional feedback device 15 is desirably between 1,000,000 and 5,000,000 counts per revolution allowing the device to more accurately represent the actual speed of AC induction motor 9. A controller 21 is operatively coupled to AC induction motor 9 and high-resolution positional feedback device 15. Controller 21 may be coupled to AC induction motor 9 and high-resolution positional feedback device 15 by an electrical connection, a wireless connection or any other suitable connection means. Controller 21 is configured to include feedback signal filtering capabilities.

The combination of high-resolution positional feedback device 15 with the process of filtering the high-resolution positional feedback signal with controller 21 allows rotary indexing table 1 to run smoothly with a very high degree of accuracy. First, the use of high-resolution positional feedback device 15 is critical to the operation of rotary indexing table 1. It provides the required accuracy and fine resolution feedback required to properly move and position rotary indexing table 1. A high-resolution feedback signal reduces speed feedback ripple by allowing controller 21 to more accurately reflect the actual speed of AC induction motor 9. The high-resolution feedback signal may be a square-wave, a sine wave or the like. Next, it is important that controller 21 is configured to include filtering capabilities. By filtering the high-resolution feedback signal, an even smoother feedback signal is created, which minimizes or eliminates erratic motion, improves stability and allows very high load-to-motor inertia mismatches.

In many applications, the inertial load of rotary indexing table 1 may be in excess of 100 times the motor inertia. In order to achieve accurate positioning and smooth motion given such high inertial loads, controller 21 must operate with very high gain. In other words, controller 21 must be capable of providing large corrections in position, speed and torque for small differences between a commanded and actual position, speed and torque. If these large corrections are not provided, stability problems arise.

Figure 4A:
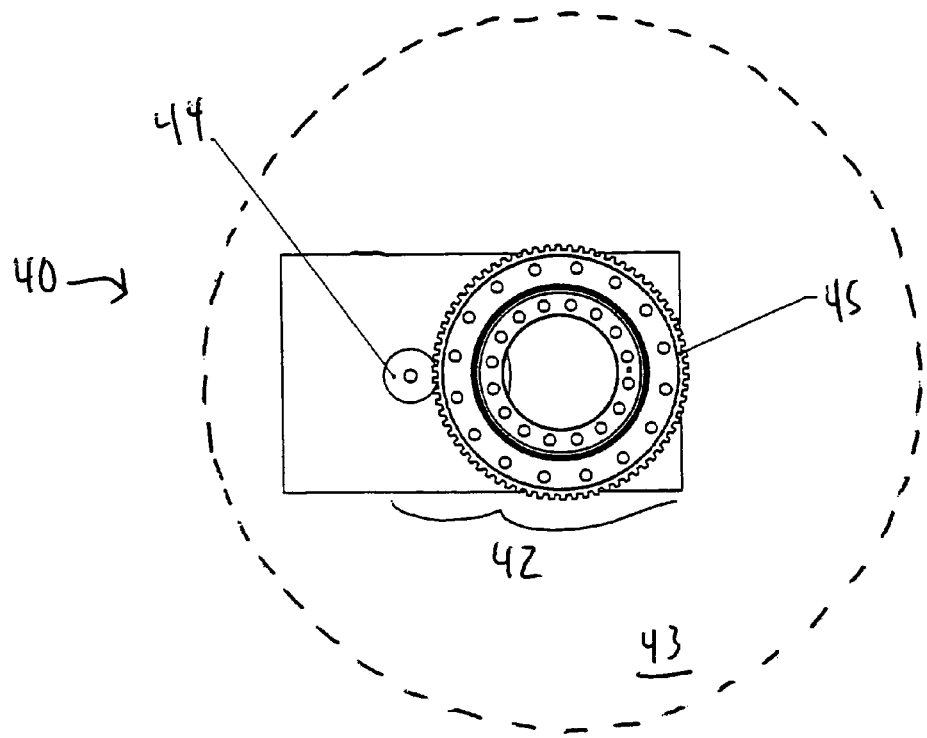
FIG. 4a is a top plan view of a second embodiment of the rotary indexing table in accordance with the present invention.
Figure 4B:
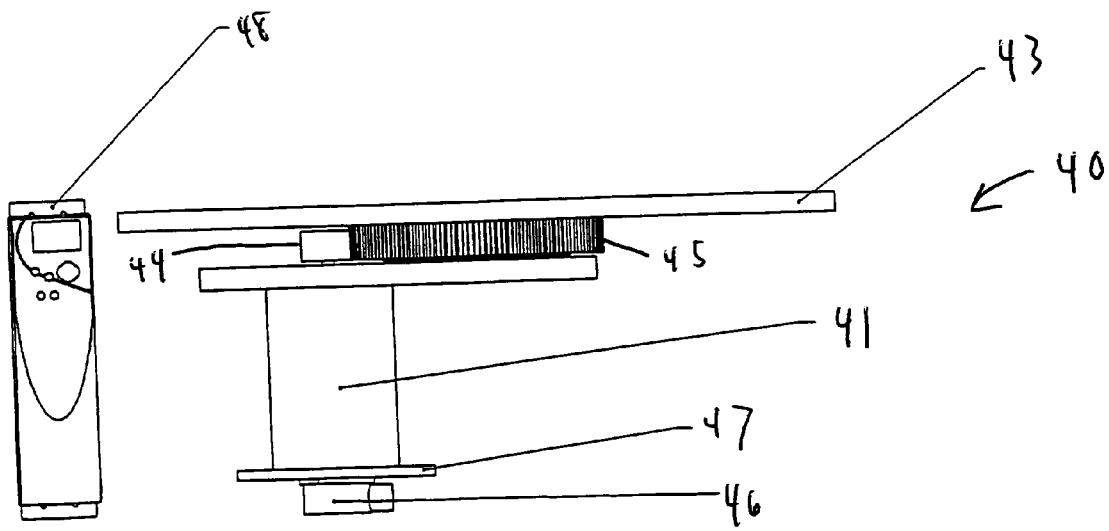
FIG. 4b is a side plan view of the second embodiment of the rotary indexing table in accordance with the present invention.

While the previous embodiment has been described in terms of a directly driven rotary table, the present invention may also be driven through the use of gearing, belting or any other suitable means. With reference to FIGS. 4a and 4b, a second embodiment of a rotary indexing table 40 with an open center driven by an AC induction motor 41 and a gear-to-gear drive 42. Rotary indexing table 40 further includes a rotatable work supporting platform 43 used to support work pieces, tooling, fixtures and the like for positioning as is known in the art. Gear-to-gear drive 42 includes pinion gear 44 and a main gear 45. Pinion gear 44 is coupled to a drive end of a motor shaft of AC induction motor 41. A drive force is provided by AC induction motor 41 to pinion gear 44 thereby causing main gear 45 to rotate. The rotation of main gear 45 provides rotation to rotatable work support platform 43.

Rotary indexing table 40 further includes a high-resolution positional feedback device 46 coupled to the opposite end of the motor shaft of AC induction motor 41 using a mounting plate 47. A controller 48 is operatively coupled to AC induction motor 41 and high-resolution positional feedback device 46. Controller 48 may be coupled to AC induction motor 41 and high-resolution positional feedback device 46 by an electrical connection, a wireless connection or any other suitable connection means. As discussed above, controller 48 is configured to include feedback signal filtering capabilities.

The combination of high-resolution positional feedback device 46 with the process of filtering the high-resolution positional feedback signal with controller 48 allows rotary indexing table 40 to run smoothly with a very high degree of accuracy as discussed in detail above reference to FIGS. 1-3.

Figure 5A:
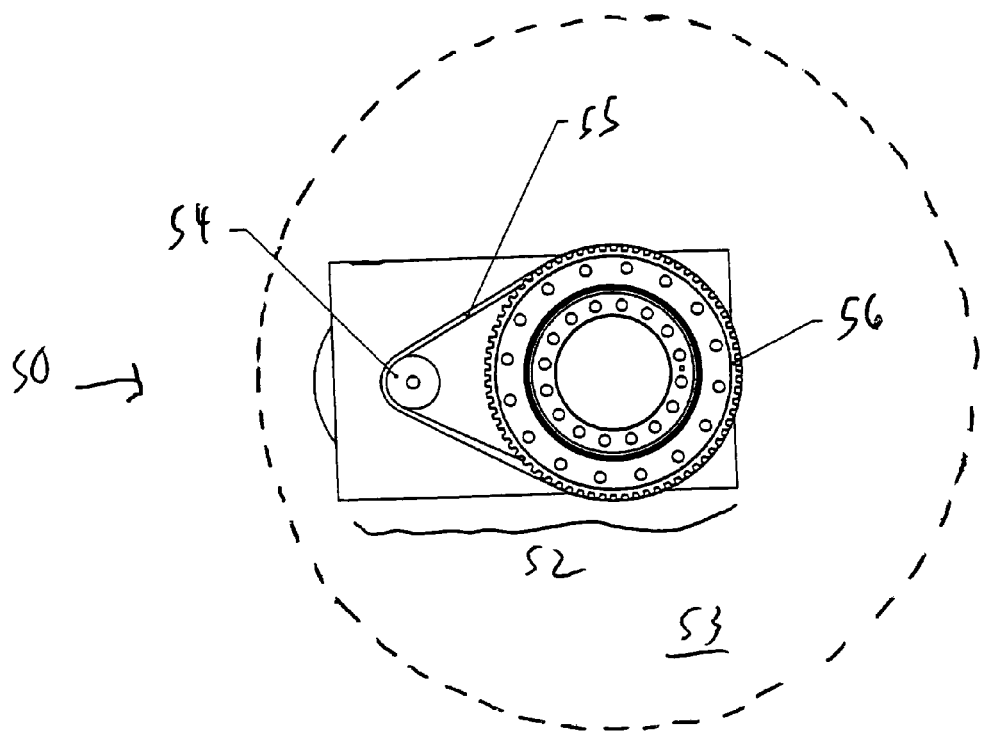
FIG. 5a is a top plan view of a third embodiment of the rotary indexing table in accordance with the present invention.
Figure 5B:
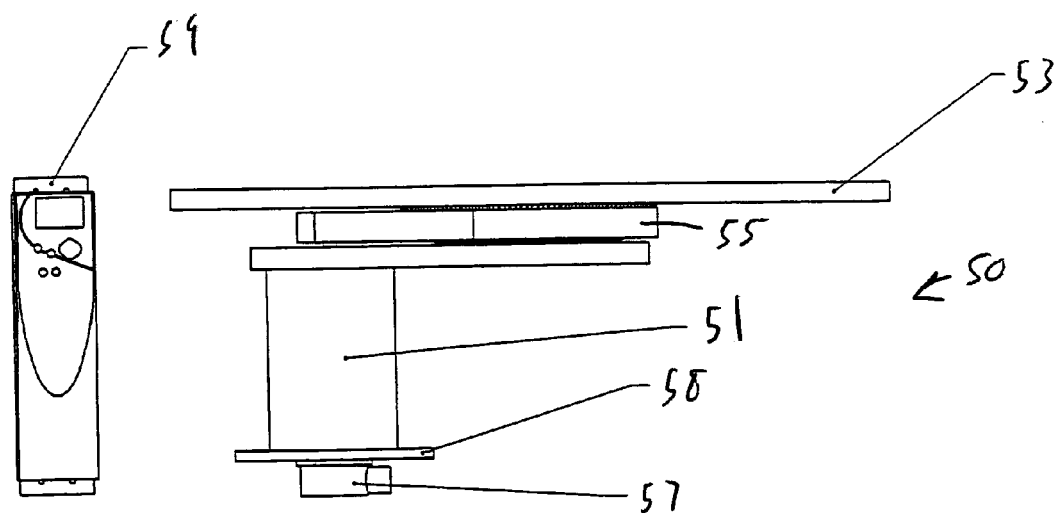
FIG. 5b is a side plan view of the third embodiment of the rotary indexing table in accordance with the present invention.

With reference to FIGS. 5a and 5b, a third embodiment of a rotary indexing table 50 with an open center is driven by an AC induction motor 51 and a belt drive 52. Rotary indexing table 50 further includes a rotatable work supporting platform 53 used to support work pieces, tooling, fixtures and the like for positioning as is known in the art. Belt drive 52 includes a toothed pulley 54, a belt 55 and a main pulley 56. Toothed pulley 54 is coupled to a drive end of a motor shaft of AC induction motor 51. A drive force is provided by AC induction motor 51 to toothed pulley 54 thereby causing force to be exerted on belt 55 causing main pulley 56 to rotate. The rotation of main pulley 56 provides rotation to rotatable work support platform 53.

Rotary indexing table 50 further includes a high-resolution positional feedback device 57 coupled to the opposite end of the motor shaft of AC induction motor 51 using a mounting plate 58. A controller 59 is operatively coupled to AC induction motor 51 and high-resolution positional feedback device 57. Controller 59 may be coupled to AC induction motor 51 and high-resolution positional feedback device 57 by an electrical connection, a wireless connection or any other suitable connection means. As discussed above, controller 59 is configured to include feedback signal filtering capabilities.

The combination of high-resolution positional feedback device 57 with the process of filtering the high-resolution positional feedback signal with controller 59 allows rotary indexing table 50 to run smoothly with a very high degree of accuracy as discussed in detail above with reference to FIGS. 1-3.

Figure 6A:
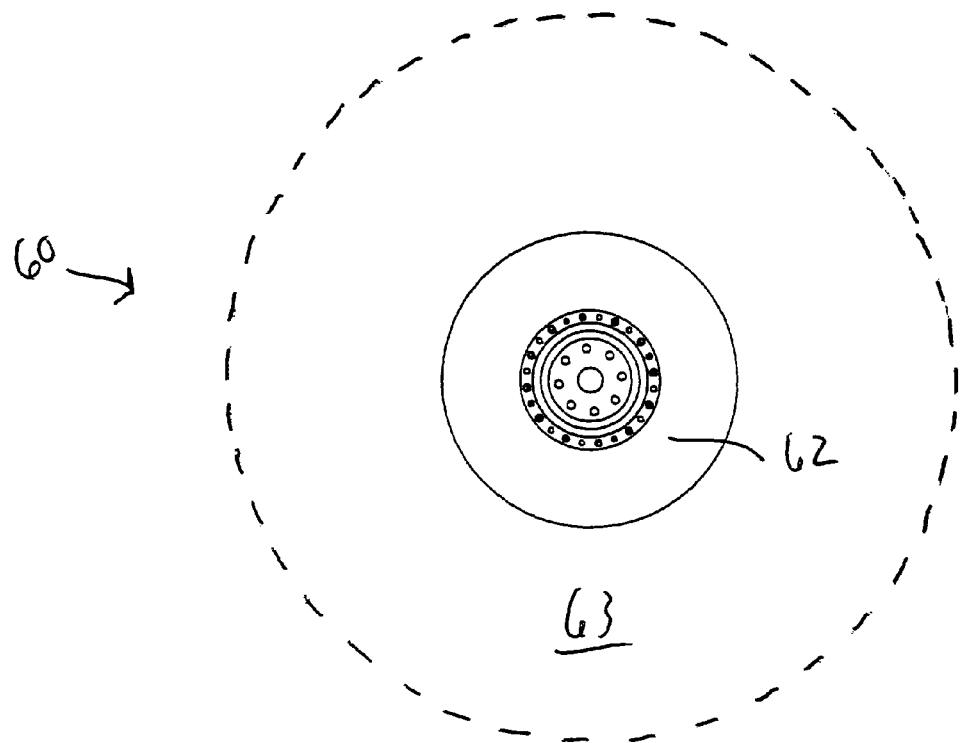
FIG. 6a is a top plan view of a fourth embodiment of the rotary indexing table in accordance with the present invention.
Figure 6B:
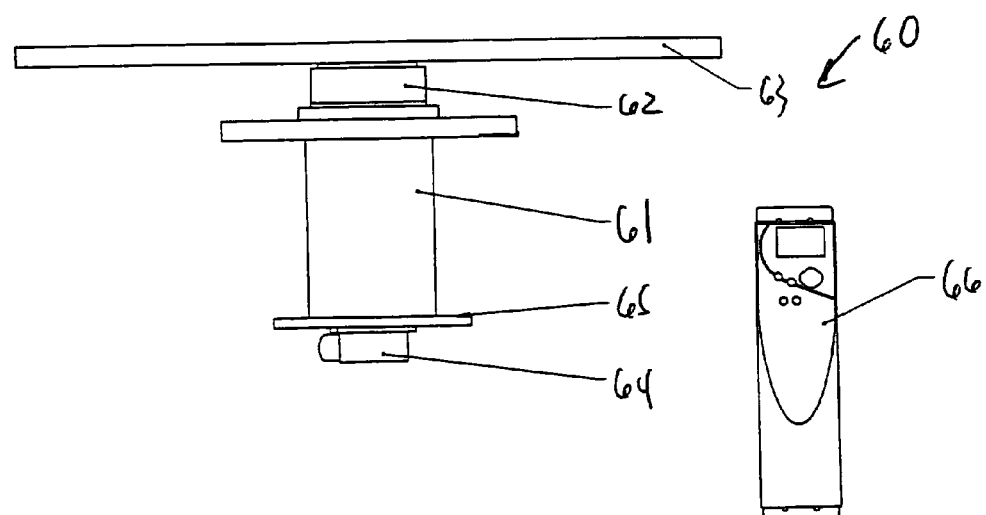
FIG. 6b is a side plan view of the fourth embodiment of the rotary indexing table in accordance with the present invention.

With reference to FIGS. 6a and 6b, a final embodiment of a rotary indexing table 60 is driven by an AC induction motor 61 and a gearhead 62. Rotary indexing table 60 further includes a rotatable work supporting platform 63 used to support work pieces, tooling, fixtures and the like for positioning as is known in the art. Gearhead 62 is coupled at a first end to rotatable work supporting platform 63 and at a second end to a drive end of a motor shaft of AC induction motor 61. A drive force is provided by AC induction motor 61 to gearhead 62 thereby causing force to be exerted on rotatable work support platform 63 causing it to rotate.

Rotary indexing table 60 further includes a high-resolution positional feedback device 64 coupled to the opposite end of the motor shaft of AC induction motor 61 using a mounting plate 65. A controller 66 is operatively coupled to AC induction motor 61 and high-resolution positional feedback device 64. Controller 66 may be coupled to AC induction motor 61 and high-resolution positional feedback device 64 by an electrical connection, a wireless connection or any other suitable connection means. As discussed above, controller 66 is configured to include feedback signal filtering capabilities.

The combination of high-resolution positional feedback device 64 with the process of filtering the high-resolution positional feedback signal with controller 66 allows rotary indexing table 60 to run smoothly with a very high degree of accuracy as discussed in detail above with reference to FIGS. 1-3.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A rotary indexing table comprising:
   a rotatable work supporting platform;
   an AC induction motor including a motor shaft;
   a gear-to-gear drive comprising a pinion gear and a main gear that is driven by the pinion gear, the pinion gear coupled to a first end of the motor shaft and the main gear coupled to the rotatable work supporting platform;
   a controller operatively coupled to the AC induction motor; and
   a high-resolution positional feedback device coupled to a second end of the motor shaft by a mounting plate and operatively coupled to the controller,
   wherein the high-resolution positional feedback device provides a feedback signal to the controller, thereby allowing rotation of the rotatable work supporting platform with a high degree of accuracy.

2. The rotary indexing table of claim 1, wherein the high-resolution positional feedback device is an encoder.

3. The rotary indexing table of claim 1, wherein the high-resolution positional feedback device is a resolver.

4. The rotary indexing table of claim 1, wherein the controller is configured to filter a signal provided by the high-resolution positional feedback device.

5. The rotary indexing table of claim 4, wherein the signal provided by the high-resolution positional feedback device is one of a square wave and a sine wave.

6. A rotary indexing table for supporting workpieces and moving the workpieces through a plurality of positions comprising:
- a rotatable, substantially planar, circular work supporting platform;
- an AC induction motor including a motor shaft;
- a gear-to-gear drive comprising a pinion gear and a main gear that is driven by the pinion gear, the pinion gear coupled to a first end of the motor shaft and the main gear coupled to the rotatable work supporting platform;
- a controller operatively coupled to the AC induction motor; and
- a high-resolution positional feedback device coupled to a second end of the motor shaft by a mounting plate and operatively coupled to the controller,
- wherein the controller is configured to filter a signal provided by the high-resolution positional feedback device.

7. The rotary indexing table of claim 6, wherein the high-resolution positional feedback device is an encoder.

8. The rotary indexing table of claim 6, wherein the high-resolution positional feedback device is a resolver.

9. The rotary indexing table of claim 6, wherein the signal provided by the high-resolution positional feedback device is one of a square wave and a sine wave.

10. A method of precisely driving and positioning a rotary indexing table comprising:
- providing a rotary indexing table including:
  - a rotatable work supporting platform;
  - an AC induction motor including a motor shaft;
  - a gear-to-gear drive comprising a pinion gear and a main gear that is driven by the pinion gear, the pinion gear coupled to a first end of the motor shaft and the main gear coupled to the rotatable work supporting platform;
  - a controller operatively coupled to the AC induction motor; and
  - a high-resolution positional feedback device coupled to a second end of the motor shaft by a mounting plate and operatively coupled to the controller,
- driving the rotatable work supporting platform using the AC induction motor, the gear-to-gear drive, and the high-resolution positional feedback device;
- receiving a feedback signal from the high-resolution positional feedback device;
- filtering the feedback signal to produce a filtered signal; and
- controlling the AC induction motor to position the rotatable work supporting platform based on the filtered signal.

11. The method of claim 10, wherein the high-resolution positional feedback device is an encoder.

12. The method of claim 10, wherein the high-resolution positional feedback device is a resolver.

13. The method of claim 10, wherein the signal provided by the high-resolution positional feedback device is one of a square wave and a sine wave.

14. The method of claim 10, wherein the filtering step involves smoothing the feedback signal.

* * * * *

UNITED STATES PATENT AND TRADEMARK OFFICE
CERTIFICATE OF CORRECTION

PATENT NO. : 7,638,963 B2 Page 1 of 1
APPLICATION NO. : 11/235681
DATED : December 29, 2009
INVENTOR(S) : Amendolea et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1037 days.

Signed and Sealed this

Ninth Day of November, 2010

David J. Kappos
*Director of the United States Patent and Trademark Office*